Aug. 21, 1934.  O. P. HAEGELE ET AL  1,970,934
WINDING MACHINE
Filed Feb. 10, 1931   3 Sheets-Sheet 1
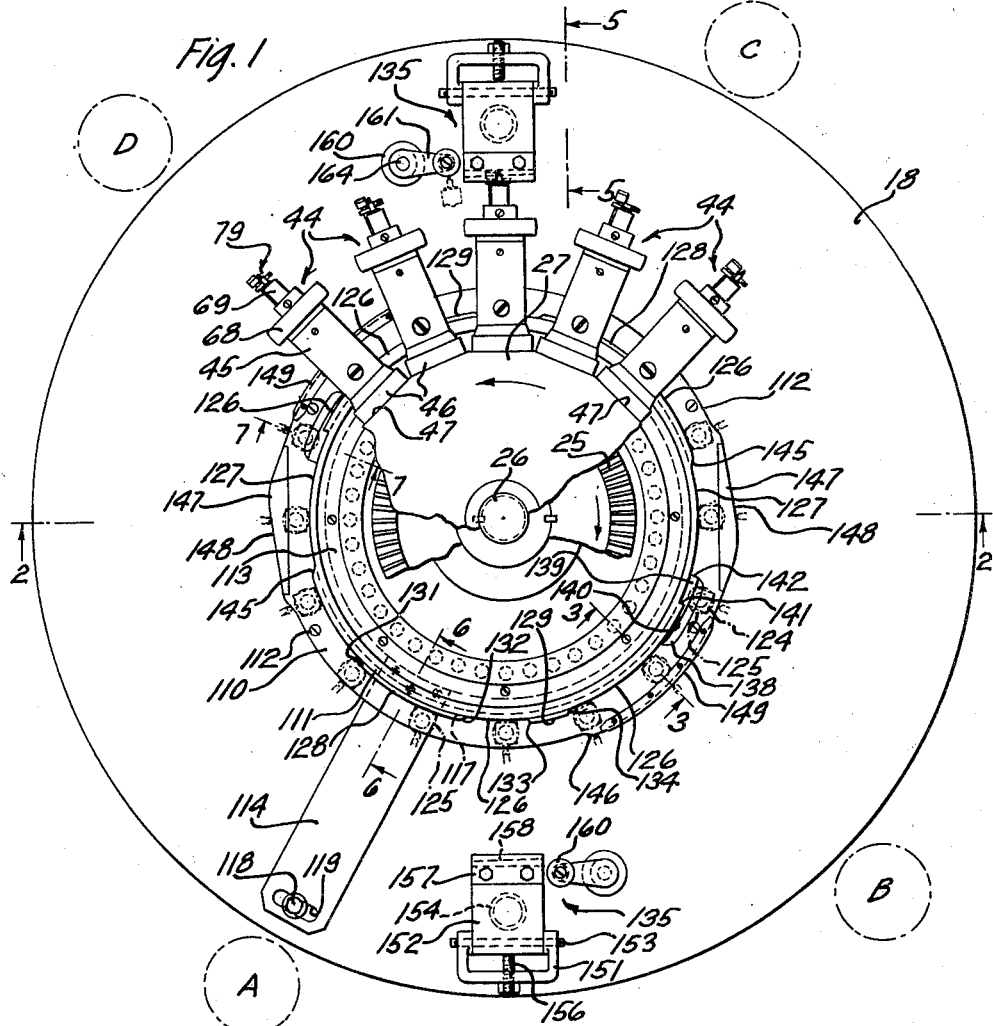
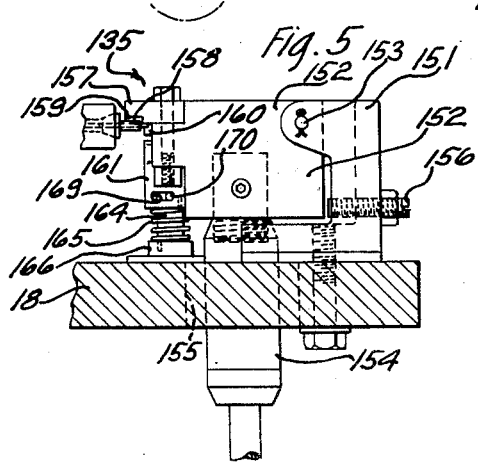
Inventors
O. P. Haegele
H. W. Larson
By H. B. Whitfield Att'y.

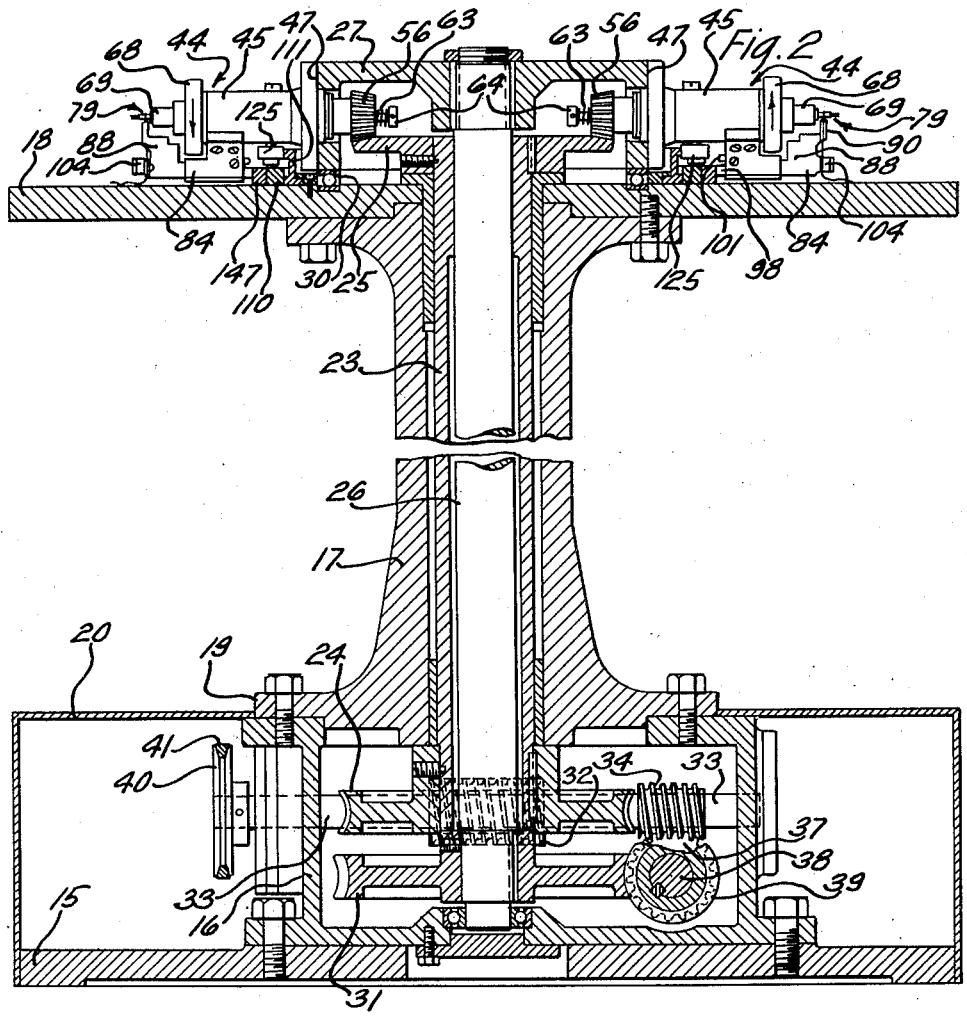

Aug. 21, 1934.  O. P. HAEGELE ET AL  1,970,934
WINDING MACHINE
Filed Feb. 10, 1931  3 Sheets-Sheet 3
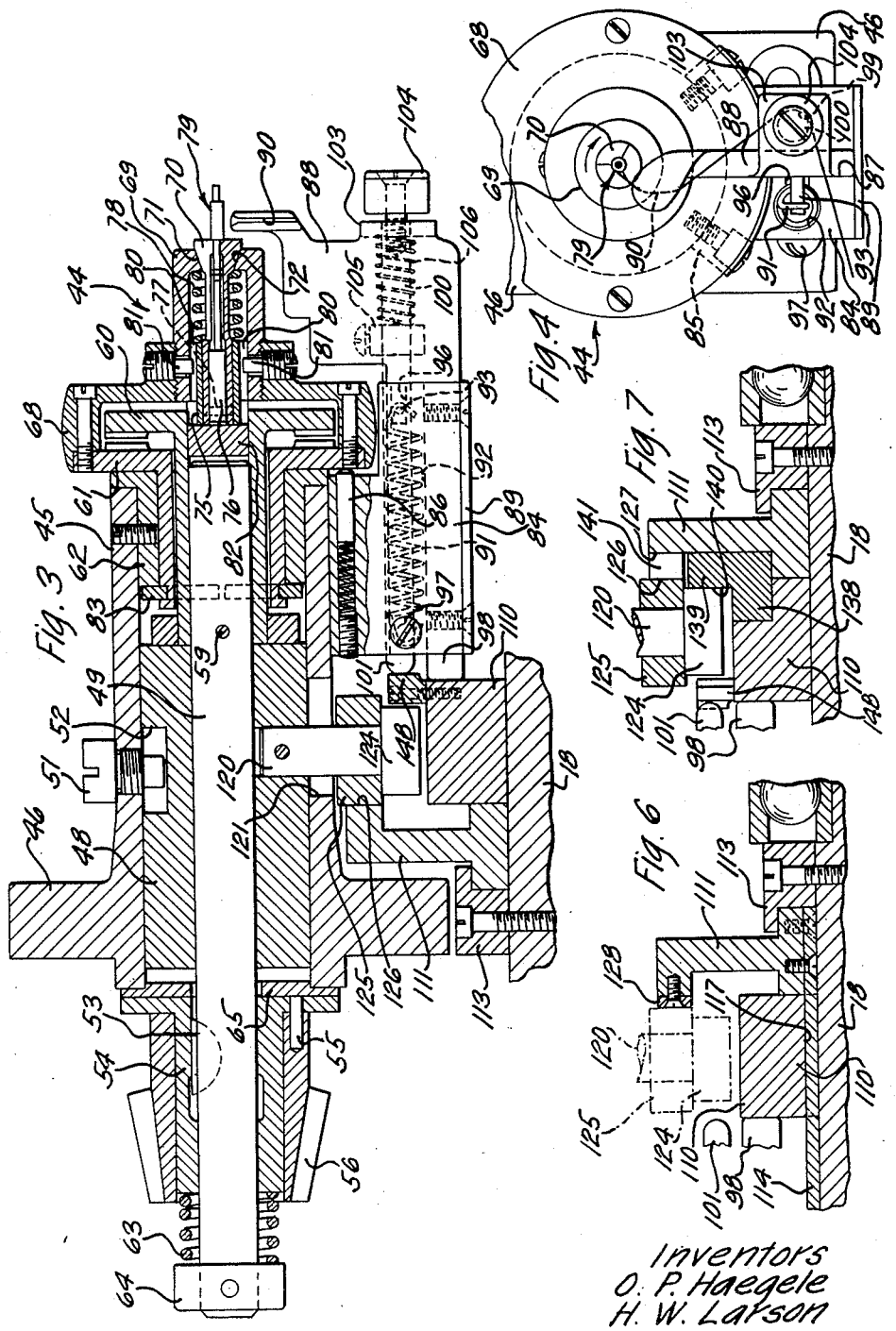
Inventors
O. P. Haegele
H. W. Larson
By J.H.B. Whitfield Att'y Patented Aug. 21, 1934

1,970,934

UNITED STATES PATENT OFFICE 1,970,934

WINDING MACHINE

Otto P. Haegele, Chicago, and Homer W. Larson, Downers Grove, Ill., assignors to Western Electric Company, Incorporated, New York, N. Y., a corporation of New York Application February 10, 1931, Serial No. 514,720

15 Claims. (Cl. 242—9)

This invention relates to winding machines, and more particularly to winding machines for electrical coils.

The primary object of this invention is to provide an improved machine for producing electrical coils rapidly, efficiently and with a minimum of manual labor.

A type of electrical coil, for instance, a telephone heat coil used to protect telephone circuits from excessive current surges, may comprise an arbor having mounted thereon a split sleeve which is definitely located with respect to the ends of the arbor, the sleeve being retained upon the arbor by a low melting point solder. Applied to the sleeve is a winding of wire to furnish a predetermined resistance. Heretofore, in some instances it has been the practice to definitely locate the sleeve upon the arbor by means of a manually operated fixture, and an electrical method of measuring the resistance of the particular length of wire to be applied is used instead of applying a predetermined number of turns of a certain size of wire which will provide the desired resistance.

In accordance with one embodiment of this invention as applied to the winding of the heretofore described type of telephone heat coil, there is provided a machine comprising a continuously rotating turret carrying a plurality of radially projecting winding elements for supporting the coil arbors with their sleeves, the latter being soldered to the arbors previous to their mounting in the machine, the winding elements being movable past a succession of operator positions and rotated about their own axes during a portion of each complete rotation of the turret, which permits the operators during the period when the elements are not rotating, to remove the arbors with their applied windings, insert additional arbors and perform other operations. Specifically, each winding element includes a reciprocable and continuously rotating spindle having axially associated therewith a chuck which holds the coil arbor, a clutch for completing the drive from the spindle to the chuck, a wire distributor and a wire tensioning device. In the continuous rotation of the turret and the spindles stationary cams cause the individual spindles to be reciprocated longitudinally for operating the chucks and the clutches and also serve to actuate the individual wired distributors and wire tensioning devices in timed relation as the winding elements are moved to consecutive positions to complete a cycle of operations between certain of the operator positions.

During one period of rotation of the turret between certain of the operator positions each arbor, with the sleeve soldered thereto, is associated with an apparatus which first fuses the solder to free the sleeve from the arbor and thereafter definitely locates the sleeve upon the arbor. Provision is made for adjusting the cam which controls the opening of the clutch for varying the period during which the arbors are rotated and thereby the number of turns of wire wound thereon.

Other objects and advantages of the invention will more fully appear from the following detailed description taken in connection with the accompanying drawings, in which Fig. 1 is a plan view, with portions removed for the sake of clearness, of a machine for winding telephone heat coils embodying the features of this invention;

Fig. 2 is a fragmentary central vertical sectional view taken on the line 2—2 of Fig. 1;

Fig. 3 is an enlarged detail vertical sectional view of one of the winding elements taken on the line 3—3 of Fig. 1, the particular winding element not being shown in Fig. 1;

Fig. 4 is a fragmentary right end view of Fig. 3;

Fig. 5 is an enlarged fragmentary sectional view taken on the line 5—5 of Fig. 1 showing the solder fusing, arbor and sleeve positioning devices;

Figs. 6 and 7 are enlarged fragmentary vertical sectional views taken on the lines 6—6 and 7—7, respectively, of Fig. 1;

Fig. 8 is an enlarged detail view of a telephone heat coil arbor after the sleeve has been positioned thereon in the operation of the machine and ready to receive a winding of wire, and Fig. 9 is an enlarged detail view of the arbor and sleeve with the applied wire winding after its removal from the machine, the winding being shown in section.

Referring now to the drawings in detail, particularly to Fig. 2, a circular base plate 15 supports a rectangular gear case 16 to which is fixed a hollow pedestal 17 which is shown fragmentarily to conserve space. A circular table member 18 is secured to the upper end of the pedestal 17, the height of the table member from the floor being such that operators may conveniently sit at certain positions therearound, which will be referred to hereinafter. Surrounding the base plate 15, a gear case 16 and a square lower flange 19 of the pedestal 17 which is fixed to the gear case 16 is a circular sheet metal housing 20 of substantially the diameter of the table member 18 and serving as a footrest for the operators. Journaled in the pedestal 17 is a hollow rotatable spindle 23 having fixed to its lower end a worm wheel 24 and at its upper end a bevel gear 25. Extending through the hollow spindle 23 is a rotatable shaft 26 journaled at its lower end in a ball race set in the lower wall of the gear case 16. The upper end of the shaft 26 has fixed thereto a hollow turret member 27, a lower surface 30 of which rides upon a ball race set in the upper surface of the table member 18.

Fixed to the shaft 26 is a worm wheel 31, the upper annular face of the hub portion thereof being adjacent the lower end face of the spindle 23. A worm 32 secured to a horizontally arranged shaft 33 journaled in opposite walls of the gear case 16 meshes with the worm wheel 24 of the spindle 23. Also secured to the shaft 33 is a worm 34 which meshes with a worm wheel 37 fixed to a horizontal shaft 38 arranged at right angles to the shaft 33 and which is likewise journaled in opposite side walls of the gear case 16. The shaft 38 has secured thereto a worm 39 which meshes with the worm wheel 31 carried on the shaft 26. A pulley 40 on the left end of the shaft 33 outside of the wall of the gear case 16 is connected by a belt 41 to a source of power, preferably an electric motor (not shown) which may be mounted on the base plate 15 within the housing 20. It will be apparent that upon the shaft 33 being rotated the shaft 26 and spindle 23 will also be rotated by means of the worm and worm wheel drive previously described and at predetermined different speeds, depending on the gear ratios, and in different directions, the shaft being rotated anticlockwise and the spindle in a clockwise direction as indicated by the arrows (Fig. 1).

Referring particularly to Figs. 1 and 2, the turret 27 carries sixteen equally spaced radially projecting coil winding elements 44, some of which, along with a portion of the turret, have been omitted from Fig. 1 for the purpose of better disclosing certain actuating mechanisms to be hereinafter described. Each of the winding elements 44 is similar in all particulars so that a detailed description of one of them will suffice. In Fig. 3 one of the winding elements 44 is shown in vertical section, the view being taken on the line 3—3 of Fig. 1. As shown in Fig. 3 a circular sleeve-like housing 45 is secured by means of an integral flange 46 to a flat outer vertical surface 47 of the turret 27 (Figs. 1 and 2). Reciprocably mounted in the housing 45 is a sleeve 48 in which is journaled a shaft 49, the sleeve being prevented from rotary motion in the housing 45 by a screw 51, carried by the housing, the lower shouldered end of the screw being entered in an elongated depression 52 formed in the sleeve 48. The shaft 49 at its left end has secured for rotation therewith, by means of a key and keyway 53, a flanged bushing 54 to which is fixed by means of a pin 55 a bevel pinion 56, the key and keyway 53 being designed to permit the shaft to be moved longitudinally of the bushing and the pinion and at the same time permit these members to rotate as a unit.

The right end of the shaft 49 has pinned thereto as indicated at 59 a driving clutch member 60 which, in a manner to be described hereinafter, is moved into and out of driving engagement with a driven clutch member 61 journaled in a bushing 62 secured to the right end of the housing 45. Surrounding the shaft 49 at its left end is a compression spring 63, opposite ends of which engage a collar 64 pinned to the shaft and an annular end face of the bushing 54. A thrust washer 65 surrounds the shaft 49 between the opposite end faces of the housing 45 and the bushing 54. The compression of the spring 63 serves normally to move the shaft 49 to the left and therewith the driving clutch member 60 to engage the cooperating clutch faces of the clutch members. Fixed to and surrounding the driven clutch member 61 is a housing member 68 which also surrounds the driving clutch member 60 and supports a chuck body 69 at its right end. Mounted in the chuck body 69 is a spring jaw chuck 70 provided with inclined peripheral faces 71 cooperating with an inclined inner peripheral face 72 of the chuck body 69. Surrounding the left end of the chuck 70 is a collar 75 which together with a shouldered stop pin 76 carried axially in the chuck is pinned as indicated at 77 to the chuck. Between the right end of the collar 75 and an inner wall of the chuck body 69 is a compression spring 78 which surrounds the chuck 70, the action of the spring normally tending to move the chuck toward the left, thereby causing the inclined faces 71 thereof to cooperate with the inclined face 72 of the chuck body 69 to move the spring jaws of the clutch towards each other to grip a coil arbor 79 which was inserted therein when the jaws were in an open position. The collar 75 is formed peripherally with diametrically opposite elongated slots 80 into which project the inner ends of shouldered screws 81 threaded into the chuck body 69, thereby insuring that the chuck 70 will rotate with the chuck body 69 when the clutch members 60 and 61 are engaged and thus eliminating the possibility of any slippage occurring between the inclined faces 71 of the chuck 70 and the inclined face 72 of the chuck body 69 when the jaws are closed upon the arbor 79.

A plug or disk 82 is loosely fitted in the bore of a sleeve portion of the driving clutch member 60 between the adjacent ends of the shaft 49 and the chuck 70 and attached collar 75. In the position shown in Fig. 3 the shaft 49 has been withdrawn from engagement with the disk 82 by the spring 63 to allow the chuck spring 78 to move the chuck 70 toward the left to close the chuck jaws upon the arbor 79. When the shaft 49 is moved toward the right at predetermined intervals in the operation of the machine it engages the disk 82 and also slides it with the chuck 70, storing energy in the spring 78 and permitting the chuck jaws to expand, thus releasing the arbor 79. A split collar 83 fitted within a channel formed in a sleeve portion of the driven clutch member 61, the right side of the collar abutting the left end face of the bushing 62, serves to prevent the driven clutch member 61 from moving longitudinally in the bushing 62.

Fixed to the right end of the housing 45 of the winding element 44 is a bracket 84, a flange 85 of the bracket being secured to the lower periphery of the housing by screws (Figs. 2 and 4). A spring pressed plunger 86 mounted in the bracket 84 and engaging an annular surface of the driven clutch member 61 applies a constant braking force thereto which does not offer appreciable resistance during the winding operation but does serve to hold the chuck 70 with the arbor 79 therein stationary when the operator is securing the outer end of the wire upon completion of the winding operation, which will be described hereinafter. Reciprocably mounted in a slideway or slot 87 of the bracket 84 (Fig. 4) is a wire distributor 88 having a grooved finger 90 at its right end arranged adjacent the periphery of the arbor 79 for guiding the wire to be wound upon the arbor. A plate 89 secured to the bracket 84 and extending across the slot 87 serves as a bottom wall of the slot. A tension spring 91 carried in an aperture 92 of the bracket 84 has one end attached to a pin 93 fixed to the distributor 88, which pin projects from the distributor and through an elongated slot 96 in a wall of the bracket between the slot 87 and the aperture 92, the opposite end of the spring being attached to a screw 97 threaded into the left vertical wall of the bracket 84 (Fig. 4) and extending into the aperture 92 for attachment to the spring 91. The spring 91 is constantly acting to move the distributor 88 toward the left (Fig. 3) to maintain a reduced left end 98 thereof against a cam surface to be presently described. Also reciprocably mounted in an aperture 99 of the bracket 84 is a rod 100 which at its left end 101 during certain periods engages cam plates which will be referred to hereinafter, and at its right end extends through an aperture provided in an angularly arranged arm 103 of the distributor 88 and has secured thereto a circular rubber head 104. Fixed to the rod 100 adjacent its right end is a block 105 (dotted outline in Fig. 3.) Carried upon the rod 100 with its opposite ends engaging the block 105 and the left side of the angular arm 103 of the distributor 88 is a compression spring 106 which is constantly acting to move the rod 100 toward the left to hold the rubber head 104 against the adjacent surface of the angular arm 103 of the distributor. The rubber head 104 pressing against the outer face of the angular arm 103 of the reciprocating wire distributor 88 and between which the wire being wound upon the arbor 79 is drawn in the winding operation serves to tension the wire as it is coiled onto the arbor.

Secured to the upper surface of the table 18 are two circular cam rings 110 and 111 (Figs. 1 and 2), the rings being arranged, one within the other, concentrically with respect to the axis of the turret 27. The cam ring 110 is stationary and is held in position by a plurality of screws 112 (Fig. 1), while the cam ring 111 is rotatably adjustable relative to the ring 110 and is held in position by a shouldered retaining ring 113 fixed to the table 18, the inner and outer peripheral surfaces of the rings 110 and 111, respectively, being in abutting relationship. Referring particularly to Figs. 1 and 6, the inner end of a radially extending arm 114 is attached to the ring 111 within a suitable notch formed in the lower surface thereof and extends through a notch 117 of suitable width formed in the stationary ring 110, the outer end of the arm terminating adjacent the peripheral edge of the table 18. The purpose of providing for an adjustment of the cam ring 111 will be described hereinafter. When the proper adjustment of the ring 111 has been made by a rotary movement of the arm 114 the latter is clamped in position against the surface of the table 18 by a screw 118 which extends through an elongated slot 119 formed in the arm 114 and threaded into the table 18 (Fig. 1).

Depending from and fixed to the sleeve 48 (Fig. 3) is a stud or pin 120 which extends through an elongated slot 121 in the housing 45, the pin having a square head 124 at its lower end.

Upon the pin 120 above the head 124 thereof is a roller 125 arranged to ride against an upper peripheral surface 126 of the cam ring 111. At diametrically opposite portions of the cam ring surface 126 it is formed with depressed similar cam surfaces 127 while at other diametrically opposite portions it is provided with projecting cam plates 128 and 129 (Figs. 1, 6 and 7), the plates 128 being of greater length than the plates 129. When the roller 125 is riding upon the peripheral surface 126 of the ring 111 between the cam surfaces 127 and plates 128 the sleeve 48 will assume the position shown in Fig. 3 with its right end engaging the left end of the sleeve portion of the driving clutch member 60 which is pinned at 59 to the shaft 49, in which position the clutch members 60 and 61 will be held out of engagement so that no rotary motion is transmitted to the chuck 70 and the spring 63 will be compressed ready to move the clutch member 60 into driving engagement with the clutch member 61 as soon as the roller 125 is permitted to move toward the left.

During the period in which the roller 125 is riding upon the cam plates 128 at which points around the table 18 two of four operator positions A, B, C and D occur as indicated at A and C (Fig. 1), the chuck 70 is in an open position, the chuck opening and closing at points 131 and 132, respectively. This is accomplished by the roller 125 as viewed in Fig. 3 being moved toward the right as it rides onto the cam plate 128 at the point 131, thus moving the shaft 49 in a similar direction and in the manner previously described, permitting the jaws of the chuck 70 to expand. As the roller 125 rides back onto the peripheral surface 126 of the ring 111 at the point 132 the energy stored in the spring 78 when the roller was riding onto the cam plate 128 at the point 131 causes a movement of the chuck 70 toward the left and in the manner previously described closes the chuck jaws. As will be referred to in the cycle of operation to be described hereinafter, each of the operators at the positions A and C removes a finished coil from and inserts an arbor 79 in the chuck 70 as it travels between the points 131 and 132. The position of the roller 125 when riding upon the cam plate 128 is indicated in dotted outline in Fig. 6.

Also during the period in which the roller 125 is riding upon the cam plates 129 the chuck 70 is in an open position, the chuck being opened and closed at points 133 and 134, respectively, in a manner identical with that described in connection with the points 131 and 132 of the cam plate 128. During the period in which the roller 125 is riding upon the surface 126 of the cam ring 111 between the points 132 and 133 of the plates 128 and 129, respectively, and along the plate 129 the arbor 79 mounted in the chuck 70 is associated with an apparatus indicated at 135 which will be described hereinafter.

Adjacent one end of each of the depressed cam surfaces 127 of the ring 111 and mounted in a depression formed in the upper surface of the cam ring 110 adjacent its inner peripheral edge is a cam member 138 (Figs. 1 and 7). A vertical arm 139 of the cam member 138 upon its inner surface abuts an adjacent outer surface of the cam ring 111 which is in alignment with the depressed cam surface 127, while the outer surface of the arm is provided with a cam surface 140 which is below the lower surface of the roller 125 and arranged in the path of the square head 124 of the pin 120. Referring particularly to Fig. 1 it will be observed that one end of the arm 139 is displaced along the cam surface 127 a distance which is at least the diameter of the roller 125. In operation, as the roller 125 travels along the surface 126 and nears the end 141 of the surface 127 the square head 124 moving therewith rides onto the cam surface 140, thereby moving the roller 125 slightly outwardly from the surface 126. The engagement of the head 124 with the cam surface 140, it will be apparent, prevents the roller 125 from moving onto the cam surface 127 as it travels past the end 141 thereof. Consequently this movement will take place only when the square head 124 rides off a sharp corner end 142 of the cam member 138, at which point the roller will be free of the end 141 of the cam surface 127 and will consequently move quickly into engagement with the surface 127 and thereby in the manner previously described cause a quick engagement of the driving clutch member 60 with the driven clutch member 61 and complete the rotary drive to the chuck 70. The clutch members 60 and 61 are maintained in engagement until the roller 125 rides onto the surface 126 of the cam ring 111 at the opposite end 145 of the surface 127. While the roller 125 is traveling along the cam surface 127 between the end 142 of the cam member 138 and the end 145 of the surface 127 the arbor 79 carried in the chuck 70 will be rotated and during this period the winding of the wire onto the arbor takes place. This period may be varied by rotating the cam ring 111 by a movement of the arm 114 (Fig. 1) in one direction or the other, in the manner previously described, to vary the position of the end 145 of the cam ring 111 relative to the sharp end 142 of the stationary cam member 138.

The left end 98 (Fig. 3) of the wire distributor 88 travels along the outer periphery of the cam ring 110 and onto a slight rise thereof at the point 146 sufficient to position the grooved finger 90 of the distributor 88 midway of the length of the winding surface of the arbor 79. Mounted in the cam ring 110 at two diametrically opposite points (Fig. 1) are inserts 147 having outer cam surfaces 148. When the end 98 of the distributor 88 rides onto the cam surface 148 the grooved distributor finger 90 has previously been positioned midway of the length of the winding surface of the arbor 79 as described hereinbefore, and the cam surface 148 is so formed that as the end 98 of the distributor 88 travels therealong the outer half of the arbor is first wound by an outward movement of the finger 90; thereafter the finger is moved inwardly to wind a complete layer across the arbor and then back to the midway point. Secured to the upper surface of the cam ring 110 at two diametrically opposite points are cam plates 149 onto which the inner end 101 of the rod 100 of the wire tensioning device rides, thereby moving the rubber head 104 away from the outer surface of the arm 103 of the distributor 88 (Fig. 3). The two other operator positions around the table 18 occur opposite the cam plates 149 as indicated at B and D (Fig. 1).

During the period when the end 101 of the rod 100 is traveling along the cam plate 149 the operator at the position B solders one end of the wire to be wound onto the arbor 79 and inserts it in the groove of the finger 90 of the distributor 88 and between the head 104 and the distributor arm 103, the head at this time being spaced from the arm as shown in Fig. 3. When the end 101 of the rod 100 is not in engagement with the cam plate 149, the spring 106 as hereinbefore described will hold the rubber head 104 against the arm 103 with sufficient pressure to tension the wire held and drawn therebetween during the winding operation. In this latter position the end 101, as shown in Fig. 6, is free.

The apparatus 135 (Figs. 1 and 5) which is arranged at diametrically opposite points adjacent the periphery of the table 18 comprises in each instance a bracket 151 secured to the table having a copper block 152 pivoted thereto at 153. Fixed to and depending from the block 152 is an electrical heating device 154 which may be a soldering iron of a usual type adapted to carry the block 152 at its heating end. An aperture 155 is formed in the table 18 through which the heating device 154 extends for connection to a source of electrical supply. The bracket 151 carries an adjustable stop screw 156 against which the block 152 normally rests in a slightly downwardly inclined position. Fixed to and projecting from the block 152 at its left side (Fig. 5) is a steel gage block 157 having formed in its under surface an inclined shouldered cam face 158 which is arranged in the path of the arbor 79 as is clearly indicated in the apparatus 135 at the upper portion of Fig. 1, it being understood that the heat from the block 152 is transmitted to the gage block. The side of the gage block 157 which is first engaged by the arbor 79 in the rotation of the turret 27 is relieved as shown at 159 in Fig. 5 so that as the arbor engages and rides under the gage block it raises the heated copper block 152 about its pivot 153, thereby insuring a good contact between the heated gage block and the arbor during its travel under the gage block. When the arbor 79 is moved from under the gage block 157 the outer end thereof engages and rides past a roller 160 carried on the end of a resiliently mounted arm 161 pivotally carried upon a vertical rod 164 fixed to the table 18. Surrounding the rod 164 is a tension spring 165 having its opposite ends connected to the arm 161 and a collar 166 fixed to the rod, the action of the spring serving to constantly urge the arm 161 in a clockwise direction, as viewed in the apparatus 135 at the upper portion of Fig. 1, to position the roller 160 in the path of the ends of the traveling arbors 79. A slot 169 in the arm 161 and a pin 170 secured to the rod 164 cooperate to hold the roller 160 in a predetermined position within the path of travel of the ends of the arbors 79. The purpose of the apparatus 135 will be referred to in the description of the cycle of operation of the machine to be presently given.

In the particular embodiment of this invention four operators attend the machine, one at each of the positions marked A, B, C and D, the operators at the positions A and C performing similar operations and likewise the operators at the positions B and D. In a complete rotation of the turret 27 two cycles of operations of each of the winding elements 44 and associated devices occur, one between the positions A and C and the other between the positions B and D. During the operation of the machine the shaft 26 and hollow spindle 23 are continuously rotated anticlockwise and clockwise, respectively, at the desired speeds by the driving mechanism hereinbefore described. The turret 27 is thus rotated anticlockwise and simultaneously therewith the spindles 49 of the winding elements 44 moving bodily with the turret are continuously rotated clockwise at a comparatively high rate of speed by means of the bevel pinions 56 thereon meshing with the bevel gear 25 carried by the clockwise rotating spindle 23. The arbor 79 which is to be wound with a predetermined number of turns of wire comprises a stud 171 carrying a split sleeve 172, the sleeve being soldered thereto previously to its insertion in the winding machine by a low melting point solder, the ends of the sleeve being spaced from the ends of the stud, with the sleeve positioned nearer one end of the stud than the other end thereof.

The following description of a cycle of operation of one of the sixteen winding elements 44 carried by the turret 27 begins at the station A and ends at the station C, but it is to be understood that each of the winding elements goes through a similar cycle twice during each rotation of the turret, once between the positions A and C and then again between the positions C and A. As the continuously moving winding element 44 approaches the point 131 of the cam plate 128 adjacent the station A the clutch members 60 and 61 are in disengaged relation, having previously been disengaged by the movement of the roller 125 onto the peripheral surface 126 of the cam ring 111 at the end 145 of the cam surface 127. When the roller 125 rides onto the cam plate 128 at the clutch opening point 131, the chuck 70 is immediately opened, the arbor at this time having received a predetermined number of turns of wire. While the roller 125 is traveling along the cam plate 128 the operator successively ties the free outer end of the wire to the applied winding by means of a suitable knot 173 (Fig. 9), or in any other suitable manner removes the finished coil from the chuck and inserts an arbor to be wound therein. The roller 125 rides off the cam plate 128 at the point 132 and the chuck 70 is closed to grip the arbor 79, followed immediately by the arbor moving under the heated gage block 157 which serves to fuse the solder, thereby freeing the sleeve 172 from the stud 171. During the continued movement of the arbor 79 along the under side of the gage block 157 the outer end face of the sleeve 172 will engage the shouldered cam face 158 of the gage block and move the sleeve inwardly upon the stud if necessary to insure that the inner end face of the sleeve is positioned against the outer face of the chuck 70 which serves as a stop. Immediately upon the arbor 79 leaving the gage block 157 the chuck 70 is opened by the roller 125 riding onto the cam plate 129 at the point 133 and thereafter the outer end of the arbor stud 171 is moved into engagement with and past the resiliently mounted roller 160 and in case the inner end of the stud is not engaged with the end face of the stop pin 76 carried axially in the chuck, the stud will be moved thereagainst.

This completes the operation of definitely locating the sleeve upon the arbor stud 171 and upon completion thereof the solder between the stud and the sleeve 172 which has been in a fused state, due to its association with the heated gaging block 157, becomes solidified again. Thereafter the roller 125 rides off the cam plate 129 at the point 134 and the chuck is closed to again grip the arbor 79. This is followed by the inner end 98 of the distributor 88 riding onto the slight rise on the periphery of the cam ring 110 at the point 146 which positions the grooved finger 90 of the distributor midway of the length of the arbor sleeve 172 and immediately thereafter the end 101 of the rod 100 carrying the rubber head 104 of the wire tensioning device rides onto the cam plate 149 adjacent the point 146, thereby spacing the head 104 from the outer face of the angular arm 103 of the distributor 88 ready to receive the wire therebetween.

The operator at the position B during the period the end 101 of the rod 100 is traveling along the cam plate 149 solders one end of a predetermined length of wire, which will provide a definite number of turns and a short length at the outer end of the coil for terminal purposes, to the sleeve 172 at an opening 175 formed therein midway of its length, inserts it in the groove of the finger 90 and between the head 104 and the distributor arm 103. The end 101 of the rod 100 then moves off the cam plate 149 to permit the spring 106 to draw the wire tensioning head 104 inwardly to grip the wire between the head and the arm 103 of the distributor 88. Thereafter in the manner previously described the square head 124 moving with the roller 125 rides off the sharp corner end 142 of the cam member 138 and causes a quick engagement of the clutch members 60 and 61 and consequently the rotation of the chuck 70 and simultaneously therewith the distributor finger 90, due to the end 98 of the distributor 88 riding onto the cam surface 148, travels along the outer half of the arbor sleeve 172, thence in a reverse direction along the entire length of the sleeve, and then back to the midway point thereof to distribute substantially two layers of wire onto the sleeve comprising a predetermined number of turns of wire. As hereinbefore described the number of turns of wire wound may be varied within a certain range by varying the position of the end 145 of the adjustable cam ring 111 relative to the sharp end 142 of the stationary cam member 138. The clutch members 60 and 61 are disengaged at the end 145 of the cam surface 127, at which point the roller 125 rides onto the peripheral surface 126 of the cam ring 111 and the distributor end 98 rides off the cam surface 148 onto the outer periphery of the cam ring 110. Following this the winding element 44 carrying the wound coil moves past the operator at the position C whereat the free end of the wire is knotted, the completed coil removed and another arbor 79 inserted in the clutch 70, all in the manner previously described as occurring at the operator's position A.

The advantages of the herein described machine are that it is continuous in operation, provides for a rapid production of uniformly constructed electrical coils having a predetermined resistance, and functions in an efficient manner and with a minimum of manual labor.

Although the invention has been disclosed and described as applied to a machine for winding a particular type of electrical coil, it is clear that it may have a more general application, and that modifications can be made without departing from the spirit and scope of the appended claims.

What is claimed is:

1. In a coil winding machine, a plurality of radially arranged coil winding elements individually rotatable about their own axes and movable as a unit about a central axis, means for causing a unitary movement of said elements about the central axis past a plurality of operator positions, cam means adjacent the path of unitary movement of said elements, and means carried by each of said elements cooperating with and responsive to said cam means for rotating each element about its own axis for a portion of and responsive to the unitary movement of the elements.

2. In a coil winding machine, a plurality of radially arranged coil winding elements individually rotatable about their own axes and movable as a unit about a central axis, means for causing a unitary movement of said elements about the central axis past a plurality of operator positions, each of said elements including spring actuated clutch members for completing a drive to rotate the element about its own axis, cam means adjacent the path of unitary movement of said elements, means cooperating with and responsive to said cam means for permitting a movement of one of the clutch members into engagement with the other to cause the rotation of each element about its own axis for a portion of the unitary movement of the elements, and means for rotating the other clutch member responsive to the unitary movement of the elements.

3. In a coil winding machine, a plurality of radially arranged coil winding spindles, said spindles being individually reciprocable in a longitudinal direction and rotatable about their own axes, means for continuously moving said spindles as a unit about a central axis, means for continuously rotating said spindles about their own axes responsive to their unitary movement, a spring closed chuck for carrying an arbor on which a coil is to be wound arranged coaxial with an end of each of the spindles, spring closed clutch members surrounding the latter end of each of the spindles, one of the members being rotatable and reciprocable with the spindle and the other member being operatively connected to the chuck, cam means adjacent the path of unitary movement of said spindles, and means operatively connected to each of the spindles engaging and responsive to said cam means for reciprocating the spindle to cause the opening and closing of the chuck and the engagement and disengagement of the clutch members to release and grip the coil arbor and to cause the rotation of each arbor about its own axis in timed relation for a portion of the unitary movement of the elements.

4. In a coil winding machine, a plurality of radially arranged winding elements individually rotatable about their own axes and movable as a unit about a central axis, said elements including individual reciprocable wire distributors, means for causing a unitary movement of the elements, and means for causing the rotation of each element about its own axis and for causing the reciprocation of the associated wire distributor for a portion of and responsive to the unitary movement of the elements.

5. In a coil winding machine, a plurality of radially arranged winding elements individually rotatable about their own axes and movable as a unit about a central axis, said elements including individual reciprocable wire distributors and tension devices, means for causing a unitary movement of the elements past a plurality of operator positions, and means for causing the rotation of each element about its own axis and for causing the reciprocation of the associated wire distributor and the tension device for a portion of and responsive to the unitary movement of the elements.

6. In a machine for winding material upon an arbor comprising a stud having a sleeve soldered thereto, a radially arranged coil winding element movable about a central axis, stop members on the element for engagement with the inner end faces of the sleeve and stud, means for moving said element with the arbor about the central axis, and means arranged in the path of the arbor and engageable with the sleeve and the stud for fusing the solder to free the sleeve upon the stud and thereafter successively moving the sleeve and the stud against their respective stop members for definitely locating the sleeve upon the stud.

7. In a machine for winding material upon an arbor comprising a stud having a sleeve soldered thereto, a plurality of radially arranged coil winding elements movable as a unit about a central axis, stop members on the element for engagement with the inner end faces of the sleeve and the stud, means for causing a unitary movement of said elements with the arbor, and means with which the arbors are engaged in their unitary movement for first fusing the solder to free the sleeve upon the stud and thereafter successively moving the sleeve and the stud against their respective stop members for definitely locating the sleeve upon the stud.

8. In a machine for winding material upon an arbor comprising a stud having a sleeve soldered thereto, a plurality of radially arranged coil winding elements movable as a unit about a central axis, said elements each having a chuck for supporting the arbor, the chuck having a stop surface for engagement with the inner end of the sleeve, a stop member within the chuck for engagement with the inner end of the stud, means for causing a unitary movement of said chucks with the arbors, means with which the arbors are engaged in their unitary movement for first fusing the solder to free the sleeve upon the stud, thereafter successively moving the sleeve upon the stud while the latter is gripped at its inner end by the chuck and the stud after being released from the chuck against their respective stop surface and member, respectively, for definitely locating the sleeve upon the stud, and means for closing and opening the chuck in timed relation with the movements of the sleeve upon the stud and the stud in the chuck.

9. In a machine for winding material upon an arbor comprising a stud having a sleeve soldered thereto, a plurality of radially arranged coil winding elements movable as a unit about a central axis, stop members on the element for engagement with the inner ends of the stud and sleeve, means for causing a unitary movement of said elements with the arbors, a solder fusing element with which each sleeve is engaged in said unitary movement for freeing the sleeve from the stud, said fusing element having a cam surface engaging the outer end face of the sleeve for moving the sleeve upon the stud after the fusing of the solder to engage the inner end face of the sleeve with its stop member, a support, and a yieldable member mounted upon the support and engaging the outer end face of each stud in the continued unitary movement of the elements for moving the inner end face thereof against its stop member to definitely locate the stud relative to the sleeve.

10. In a machine for winding material upon an arbor comprising a stud having a sleeve mounted thereon, an element for supporting and rotating the arbor and for moving the arbor along a predetermined path, stop members on the element for engagement with the sleeve and stud, and means positioned along said path for moving the sleeve and the stud into engagement with their respective stop members to predeterminedly locate the sleeve upon the stud.

11. In a coil winding machine, a coil winding element rotatable about its own axis and bodily movable along a predetermined path, means for rotating the element about its own axis, a material distributor reciprocable longitudinally of said winding element, and means rendered effective by a movement of the element along said path for reciprocating the distributor.

12. In a coil winding machine, a coil winding element rotatable about its own axis and bodily movable along a predetermined path, means for rotating the element about its own axis, and means rendered effective by a movement of the winding element along said path for tensioning the material being coiled by the element.

13. In a coil winding machine, a coil winding element rotatable about its own axis and bodily movable about an external axis, means for moving said element about the external axis, means including a clutch mechanism movable with said element actuated by the bodily movement of the element for causing a rotation of said element about its own axis for a portion of its movement about the external axis, and means for varying the portion of the movement about the external axis during which the element is rotated about its own axis.

14. In a coil winding machine, a coil winding element rotatable about its own axis and bodily movable along a predetermined path, and means including a clutch mechanism movable with said element actuated by a bodily movement of the element along said path for intermittently rotating said element about its own axis during the bodily movement of said element along said predetermined path.

15. In a coil winding machine, a rotatable support, a gear coaxial therewith, a plurality of coil winding elements rotatably journaled in said support, a driving pinion for each winding element, all of said driving pinions being in mesh with said gear, means for rotating said support relative to said gear to move the winding elements bodily about the axis of the support and simultaneously rotate the winding elements about their individual axes, and means actuated by the bodily movement of the winding elements for intermittently disconnecting said winding elements from their respective pinions.

OTTO P. HAEGELE.
HOMER W. LARSON.